UNITED STATES PATENT OFFICE.

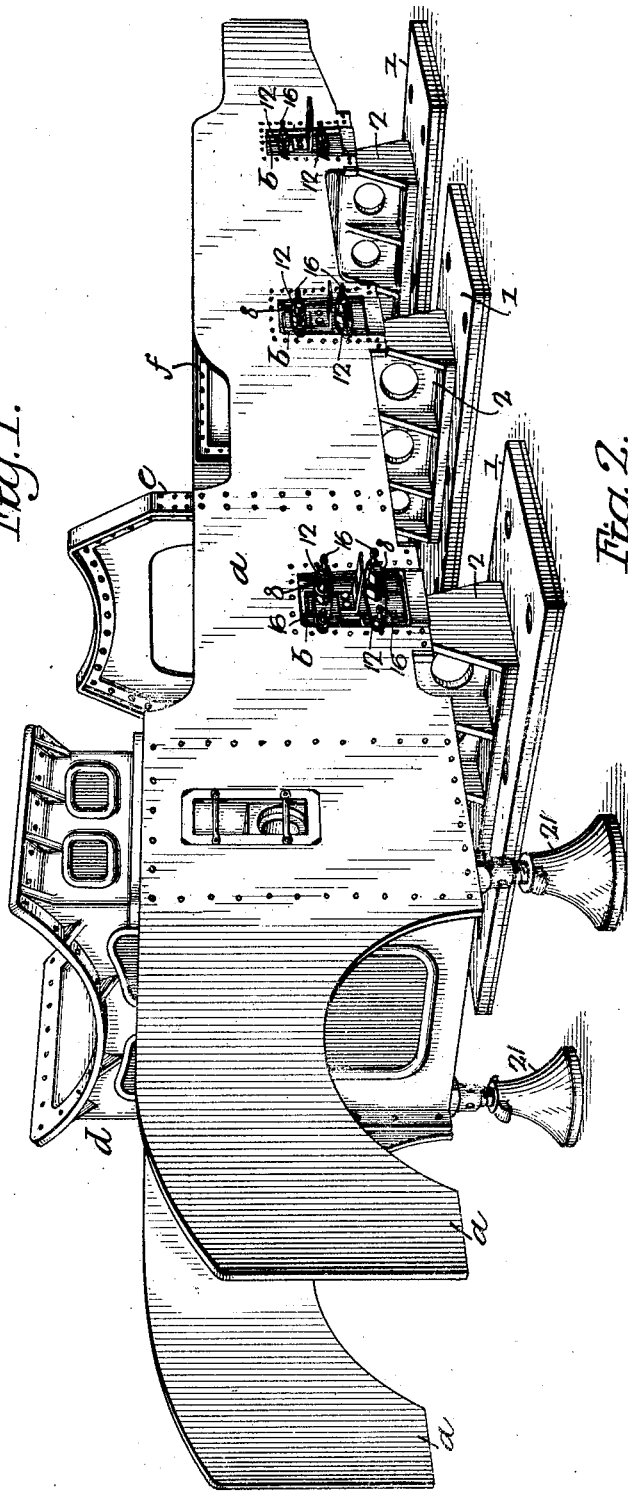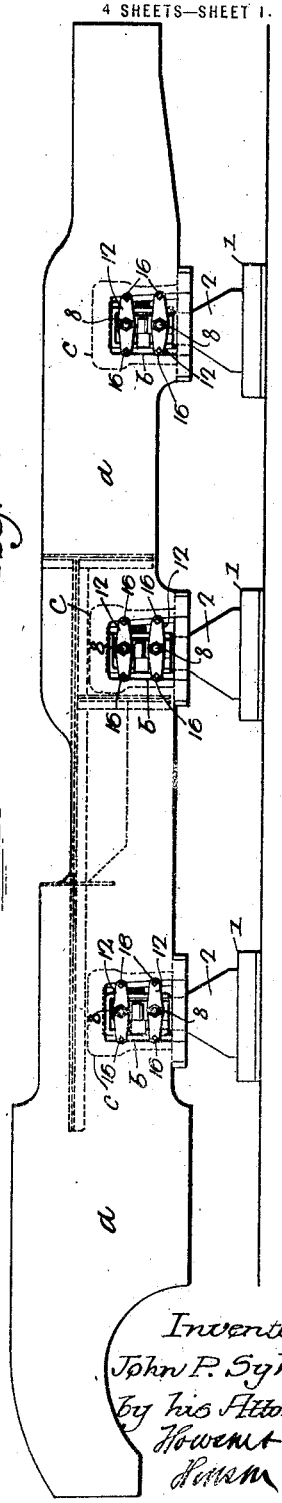

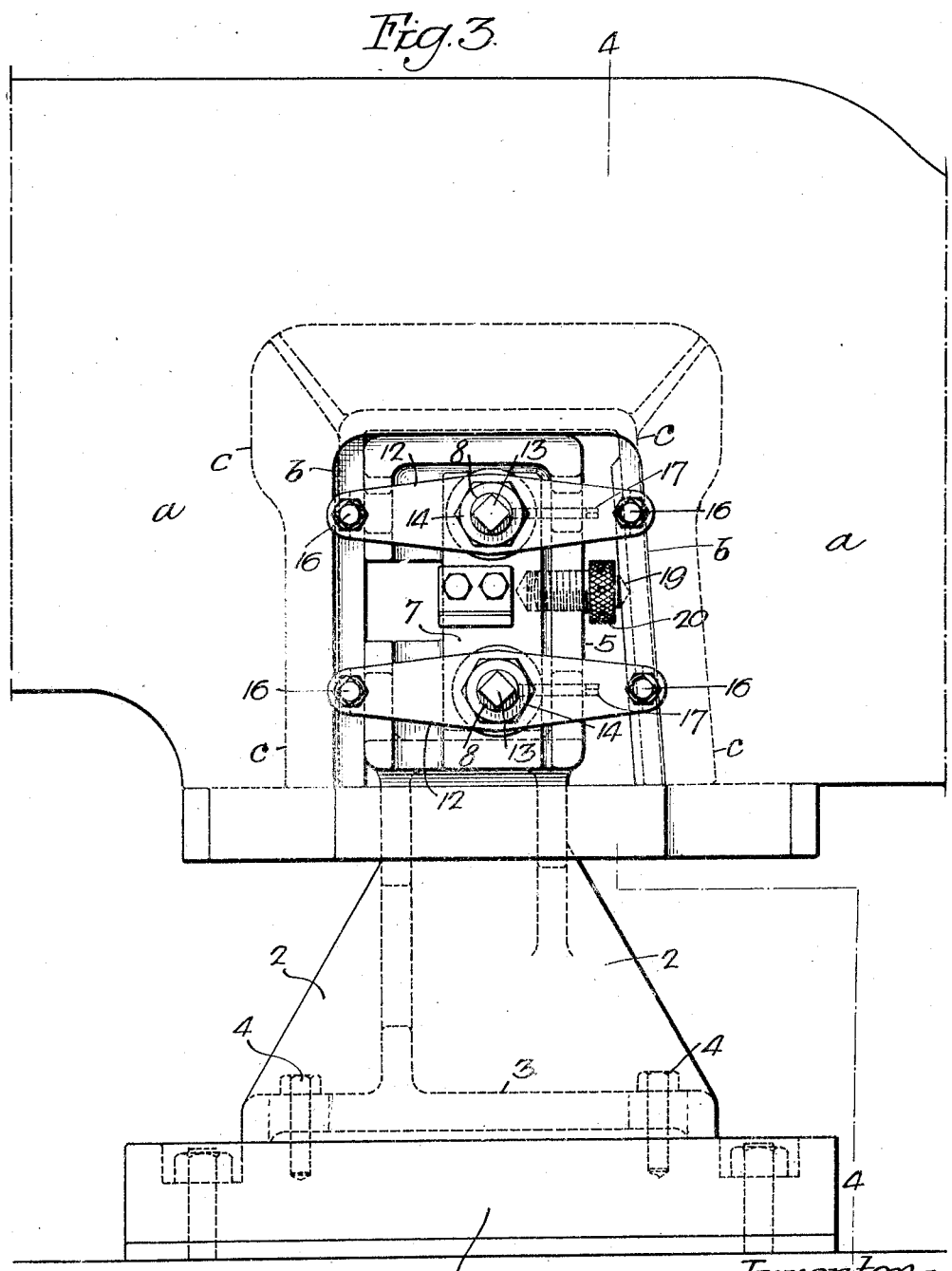

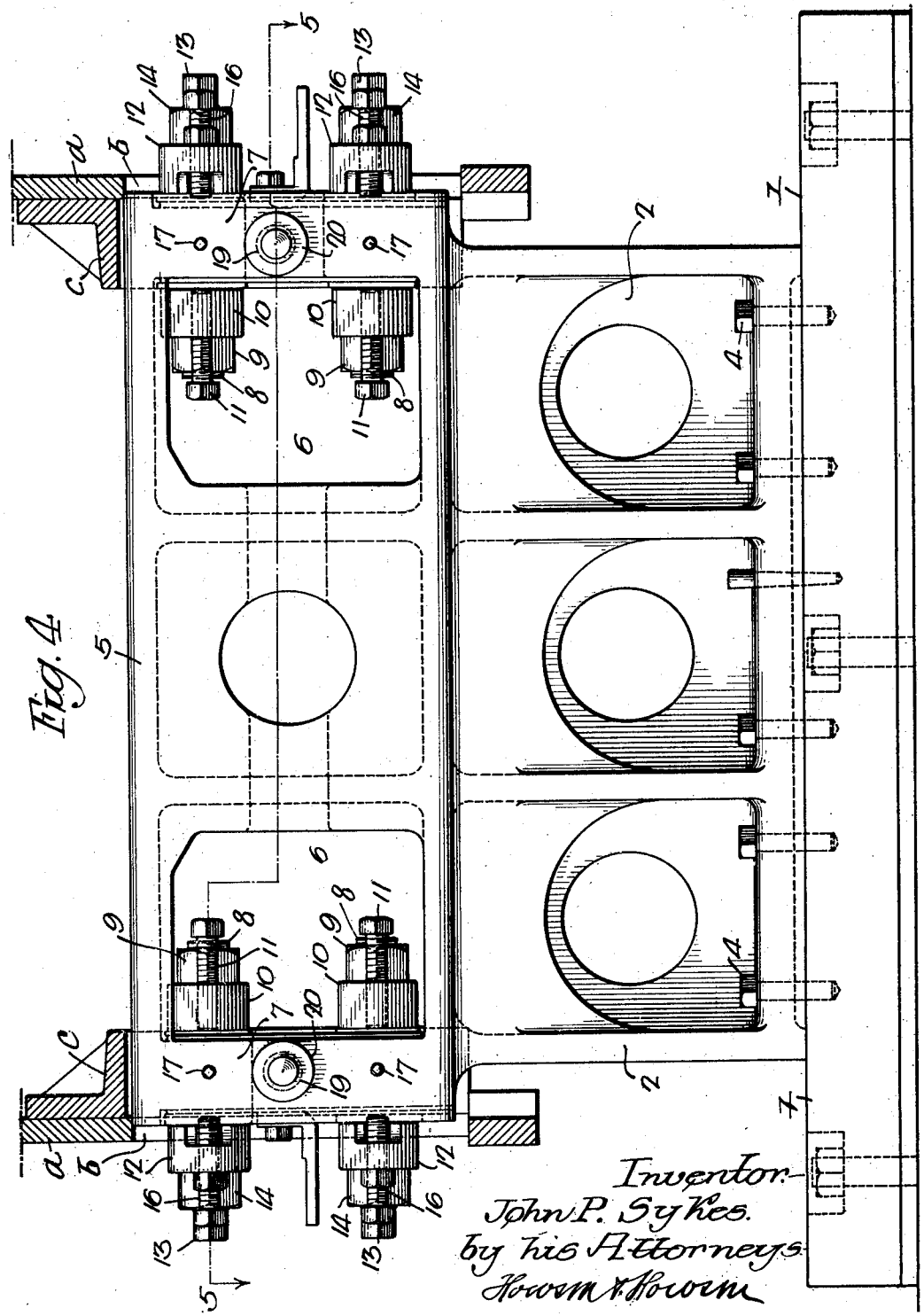

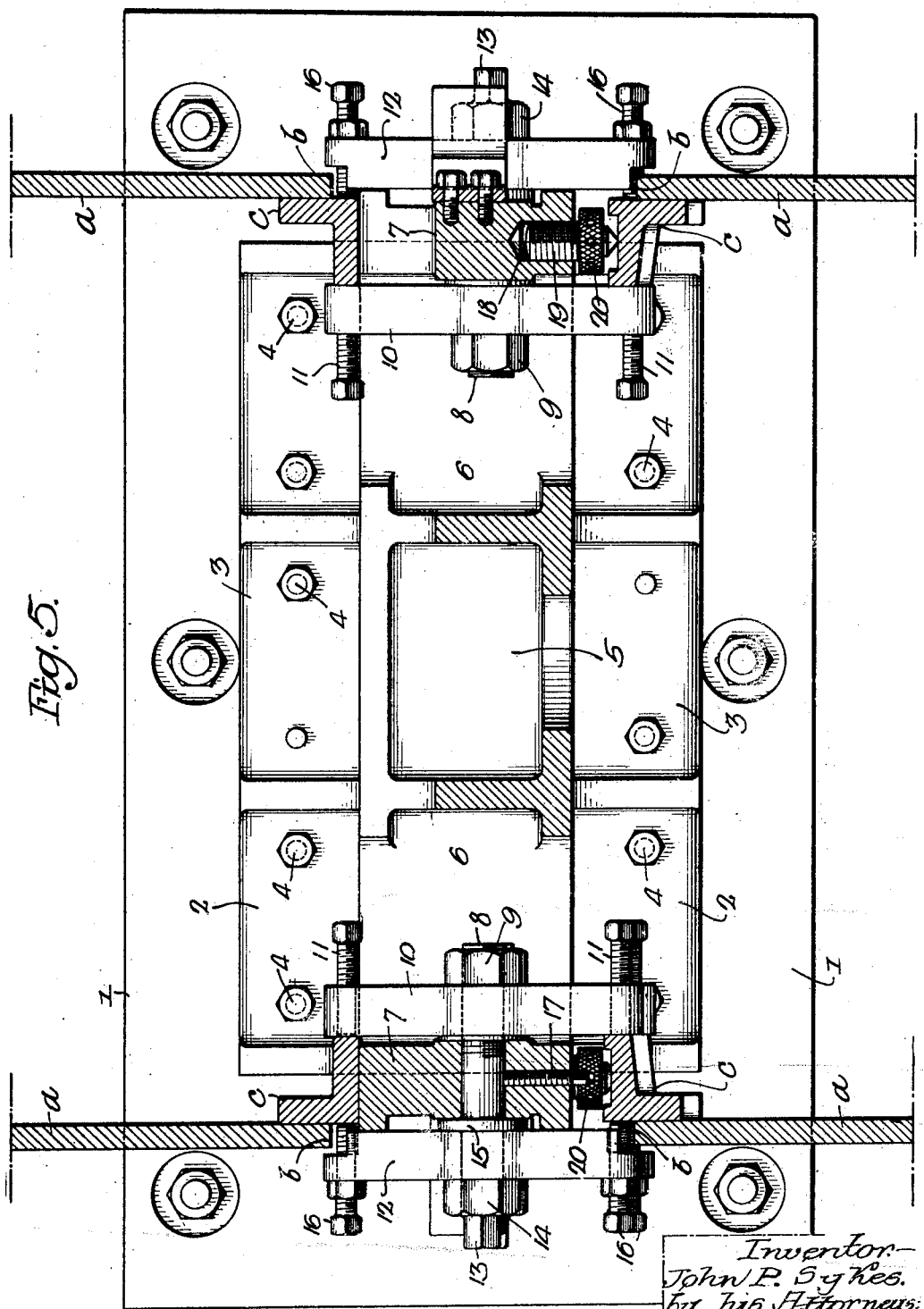

JOHN P. SYKES, OF WALLINGFORD, PENNSYLVANIA, ASSIGNOR TO THE BALDWIN LOCOMOTIVE WORKS, OF PHILADELPHIA, PENNSYLVANIA, A CORPORATION OF PENNSYLVANIA.

JIG FOR ALINING LOCOMOTIVE AND LIKE FRAMES.

1,369,574.     Specification of Letters Patent.     Patented Feb. 22, 1921.

Application filed July 1, 1920. Serial No. 393,322.

*To all whom it may concern:*

Be it known that I, JOHN P. SYKES, a citizen of the United States, residing in Wallingford, Delaware county, Pennsylvania, have invented certain Improvements in Jigs for Alining Locomotive and like Frames, of which the following is a specification.

My invention relates to certain improvements in means for assembling the side plates of locomotive and like frames so as to insure the proper alinement of one frame in respect to the other and the correct assembling of the several elements which make up the frame.

The object of my invention is to provide a jig formed of one or more saddles, on which the side plates can be mounted in proper alinement with each other so that the plates will be held rigidly while the several parts of the locomotive, which are bolted to the frame, can be accurately assembled and secured thereto.

While my invention is especially adapted for use in assembling locomotive side frames made of continuous plates of sheet metal, the jig can be used for other types of frames without departing from the essential features of the invention.

In the accompanying drawings:

Figure 1 is a perspective view, showing a locomotive frame assembled on my improved jig;

Fig. 2 is a side view, showing one of the side frames mounted on the several saddles;

Fig. 3 is an end view of one of the saddles, showing a part of the frame in position;

Fig. 4 is a transverse sectional view on the line 4—4, Fig. 3, and

Fig. 5 is a sectional plan view on the line 5—5, Fig. 4.

Referring to the drawings, 2 are the saddles mounted on bases 1. These bases may be separate, as shown in Fig. 1, or may be continuous, as desired, and are made of concrete, in the present instance. In the type of frame shown in Fig. 1, three saddles are required. Each saddle is of the form illustrated in Figs. 3, 4 and 5. In the present instance, each side frame $a$ of the locomotive has three openings $b$ for the axle boxes of the driving wheels. I utilize these openings in assembling the plates on the saddles. The number of saddles will depend upon the number of axle box openings, or pedestals, in the side plate.

It will be understood on referring to Figs. 4 and 5 of the drawings, that the plates $a$ are reinforced by a flanged member $c$, which extends over the opening $b$ in the plate and on each side thereof, as shown by dotted lines in Fig. 3. This reinforced piece $c$ is secured to the plates $a$ prior to their being assembled on the saddles. I utilize this reinforcing piece as a means for adjusting the plates to the saddles. Each saddle 2 has an enlarged base section 3, which is bolted to the base 1. In some instances, the saddles may be adjustably mounted on the base so that they can be moved longitudinally in respect to each other. The base, in this instance, may be extended and the base sections may have slots therein, as shown by dotted lines in Fig. 3, for the passage of the bolts 4. The upper portion 5 of each saddle has openings 6 at each side so that the clamp plates 10 can be passed through these openings. These clamp plates bear against the projecting flanges of the reinforcing piece $c$ and are held to the end sections 7 of the saddles by bolts 8, each bolt having a nut 9 at the inner end. Set screws 11 extend through threaded openings in the clamp plates 10 and bear upon the edges of the flanges of the reinforcing piece $c$.

12 is the outer clamp plate through which the bolt 8 passes. This bolt has a square head 13, in the present instance. On the bolt is a nut 14, which holds the clamp plate 12 in position against a flange 15 on the bolt. At each end of the clamp plate are set screws 16, which bear upon the reinforcing piece $c$ of the frame $a$, as shown clearly in Fig. 5. By this means, the two side frames $a$—$a$ are held in proper position in respect to each other. Each bolt 8 is prevented from turning in the end sections by confining screws 17.

Mounted in a threaded opening 18 in each end section is a set screw 19 having a knurled head 20, which is preferably perforated for the reception of a tool. This set screw has a pointed end, which bears against the inner surface of the reinforcing piece $c$ at one side, while the frame bears directly against the other side of the reinforcing piece, as clearly shown in Fig. 5, thus holding the frame in proper position longitudinally.

When there is an extreme overhang of the side plates, as shown in the drawings, this overhang portion may be supported by jacks 21, as shown in Fig. 1. When the two plates *a—a* have been located in proper position on the saddles, the elements that are secured to the frame, such as the locomotive saddle *d* and the cross frames *e* and *f* are located in position and securely riveted, or bolted, to the side frames. Other parts, such as cylinder castings, may also be bolted to the side frames.

By the use of a jig of the above construction, accuracy is assured in assembling locomotive frames.

I claim:

1. The combination in a jig for assembling locomotive and other frames, of a series of saddles arranged to support the frame; and means, carried by the saddles, for alining the frames.

2. The combination in a jig for assembling locomotive and other frames, of a series of saddles, each saddle carrying clamps by which the frame is secured thereto; and means for adjusting the side frames on the saddles.

3. The combination in a jig for assembling locomotive and other frames of a series of saddles spaced apart and arranged in alinement with the pedestal openings in the frames; clamps located on each saddle, one set of clamps bearing against the inner side of the plates at the pedestal openings, and the other set bearing on the outside of the plates; and bolts for securing the clamps together and to the frame.

4. The combination in a jig for assembling locomotive and other frames, of a series of saddles, the saddles being spaced apart and in alinement with the pedestal openings in the frames; clamps carried by each saddle, one set of clamps bearing against the inside of the frame and the other set of clamps bearing against the outside of the frame; bolts securing the clamps together; and adjusting screws on the clamps bearing against the frames so that on turning the adjusting screws the frames can be held in alinement.

5. The combination in a jig for assembling locomotive and other frames, of a series of saddles, the saddles being spaced apart and in alinement with the pedestal openings in the frames; clamps carried by each saddle, one set of clamps bearing against the inside of the frame and the other set of clamps bearing against the outside of the frame; bolts securing the clamps together; adjusting screws on the clamps bearing against the frames so that on turning the adjusting screws the frames can be held in alinement; and set screws carried by the saddles and bearing against one of the walls of the pedestals so as to adjust the frames longitudinally.

6. The combination in a jig for assembling locomotive and other frames, of a saddle having clamp plates; and bolts securing the clamp plates together, each clamp plate having an adjusting screw at each end for engagement with the frame.

JOHN P. SYKES.